(12) United States Patent
Graber et al.

(10) Patent No.: US 6,588,540 B2
(45) Date of Patent: Jul. 8, 2003

(54) STEER-BY-WIRE REDUNDANT HANDWHEEL CONTROL

(75) Inventors: David Wayne Graber, Millington, MI (US); Brian Jerome Magnus, Frankenmuth, MI (US); Timothy Wesley Kaufmann, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/915,887

(22) Filed: Jul. 26, 2001

(65) Prior Publication Data

US 2003/0019685 A1 Jan. 30, 2003

(51) Int. Cl.⁷ .................................................. B62D 5/06
(52) U.S. Cl. .......................... 180/402; 180/446; 701/41
(58) Field of Search .............................. 180/400, 402, 180/404, 403, 415, 422, 444, 446; 701/41, 42

(56) References Cited

U.S. PATENT DOCUMENTS

| | | | | |
|---|---|---|---|---|
| 4,860,844 A | * | 8/1989 | O'Neil ......................... | 180/402 |
| 5,236,335 A | * | 8/1993 | Takeuchi et al. .............. | 180/446 |
| 5,247,441 A | * | 9/1993 | Serizawa et al. ............. | 180/402 |
| 5,251,135 A | * | 10/1993 | Serizawa et al. .............. | 701/42 |
| 5,347,458 A | | 9/1994 | Serizawa et al. ....... | 364/424.05 |
| 5,511,629 A | | 4/1996 | Vogel ......................... | 180/79.3 |
| 5,896,942 A | * | 4/1999 | Bohner et al. ............... | 180/402 |
| 6,018,691 A | * | 1/2000 | Yamamoto et al. .......... | 180/404 |
| 6,097,286 A | * | 8/2000 | Discenzo ..................... | 180/415 |
| 6,138,788 A | * | 10/2000 | Bohner et al. ............... | 180/402 |
| 6,148,949 A | * | 11/2000 | Kobayashi et al. .......... | 180/404 |
| 6,176,341 B1 | * | 1/2001 | Ansari ......................... | 180/402 |
| 6,208,923 B1 | * | 3/2001 | Hommel ...................... | 180/400 |
| 6,219,604 B1 | * | 4/2001 | Dilger et al. ................ | 180/422 |
| 6,269,903 B1 | * | 8/2001 | Bohner et al. ............... | 180/402 |
| 6,279,675 B1 | * | 8/2001 | Bohner et al. ............... | 180/403 |
| 6,363,305 B1 | * | 3/2002 | Kaufmann et al. .......... | 180/402 |
| 6,370,460 B1 | * | 4/2002 | Kaufmann et al. .......... | 180/402 |
| 6,415,212 B2 | * | 7/2002 | Nishizaki et al. .............. | 701/41 |
| 6,427,104 B1 | * | 7/2002 | Matsushita et al. ........... | 701/41 |
| 6,470,250 B2 | * | 10/2002 | Nishizaki et al. .............. | 701/42 |
| 2002/0033301 A1 | * | 3/2002 | Clephas ...................... | 180/446 |
| 2002/0103589 A1 | * | 8/2002 | Millsap et al. .............. | 180/400 |
| 2002/0108804 A1 | * | 8/2002 | Park et al. ................... | 180/444 |
| 2002/0129988 A1 | * | 9/2002 | Stout et al. .................. | 180/400 |

FOREIGN PATENT DOCUMENTS

| | | | | |
|---|---|---|---|---|
| DE | 100 35 259 A1 | * | 2/2002 | ............ B62D/5/04 |
| EP | 1097855 A2 | * | 5/2001 | ............ B62D/5/04 |
| EP | 1 227 027 A2 | * | 7/2002 | ............ B62D/6/00 |
| JP | 2001114123 A | * | 4/2001 | ............ B62D/5/04 |

* cited by examiner

Primary Examiner—Lesley D. Morris
Assistant Examiner—Daniel Yeagley
(74) Attorney, Agent, or Firm—Edmund P. Anderson

(57) ABSTRACT

An apparatus and method for steering a vehicle (not shown) provides an input member or steering wheel for receiving steering inputs from a user; a steering-torque sensor mechanically coupled to the input member for sensing the torque applied to the steering wheel; a control circuit electronically coupled to the steering-torque sensor for producing a signal corresponding to the measured driver steering torque; an output actuator electronically coupled to the control circuit and road wheel for receiving the electronic signal and translating it into mechanical motion; and an output member or road wheel mechanically coupled to the output actuator for steering the vehicle (not shown).

16 Claims, 3 Drawing Sheets

6,588,540 B2

STEER-BY-WIRE REDUNDANT HANDWHEEL CONTROL

TECHNICAL FIELD

The present disclosure relates to a vehicular steer-by-wire system, and more particularly, to a redundant sub-system for providing controllability in the event of a partial system failure.

BACKGROUND

Modern vehicles are increasingly equipped with sophisticated electronic control systems for achieving finer control. Steer-by-wire is one variety of control system in which the conventional direct mechanical linkage between the input device (e.g., steering wheel or handwheel) and the output device (e.g., steered road wheel) is replaced with a system incorporating electronic input sensors, control circuitry, and output actuators.

In conventional steering assemblies, the operator controls the direction of the vehicle with the aid of a steering wheel. This wheel is typically mechanically connected through a gear assembly to the road wheels. To aid the operator, many systems utilize an auxiliary system to generate a force that is transmitted to a steering gear assembly. The additional force reduces the effort required by the operator in changing the direction of the vehicle. Typically, this auxiliary force is generated by either a hydraulic drive or an electric motor.

One desirable feature of conventional systems is the robust nature of their components. A pending mechanical failure generally exhibits detectable symptoms prior to significant failure. Thus, a feature desirable in a steer-by-wire system is a redundant sub-system to permit continuation of steering control in the case of a sensor failure.

Under the prior art, steer-by-wire systems typically rely on a steering wheel position sensor, the output of which is used to compute a control signal to a road-wheel actuator. Redundancy is typically accomplished with duplicate components, such as duplicate steering wheel position sensors, which improve neither performance nor functionality during normal operation. Accordingly, it is desirable to provide redundancy in a steer-by-wire system without requiring significant duplication of components.

SUMMARY

Redundant or fail-safe control of an output device, such as steered road wheels, is provided in the unlikely event of missing or erroneous steering-angle signals from an input device, such as a steering wheel.

The steer-by-wire system includes an input member or steering wheel for receiving the steering inputs made by an operator, a steering-torque sensor connected to the steering wheel for sensing the level of torque being applied by the operator, a control circuit connected in electronic communication with the steering-torque sensor for controlling the actuation of at least one steered road wheel, an output actuator or motor electronically connected to the control circuit for effecting actuation of the steered road wheel, and an output member or tie rod connected between the motor and the road wheel for mechanically translating motor position into road wheel steering angle.

DESCRIPTION OF EXEMPLARY EMBODIMENTS

Figure 1:
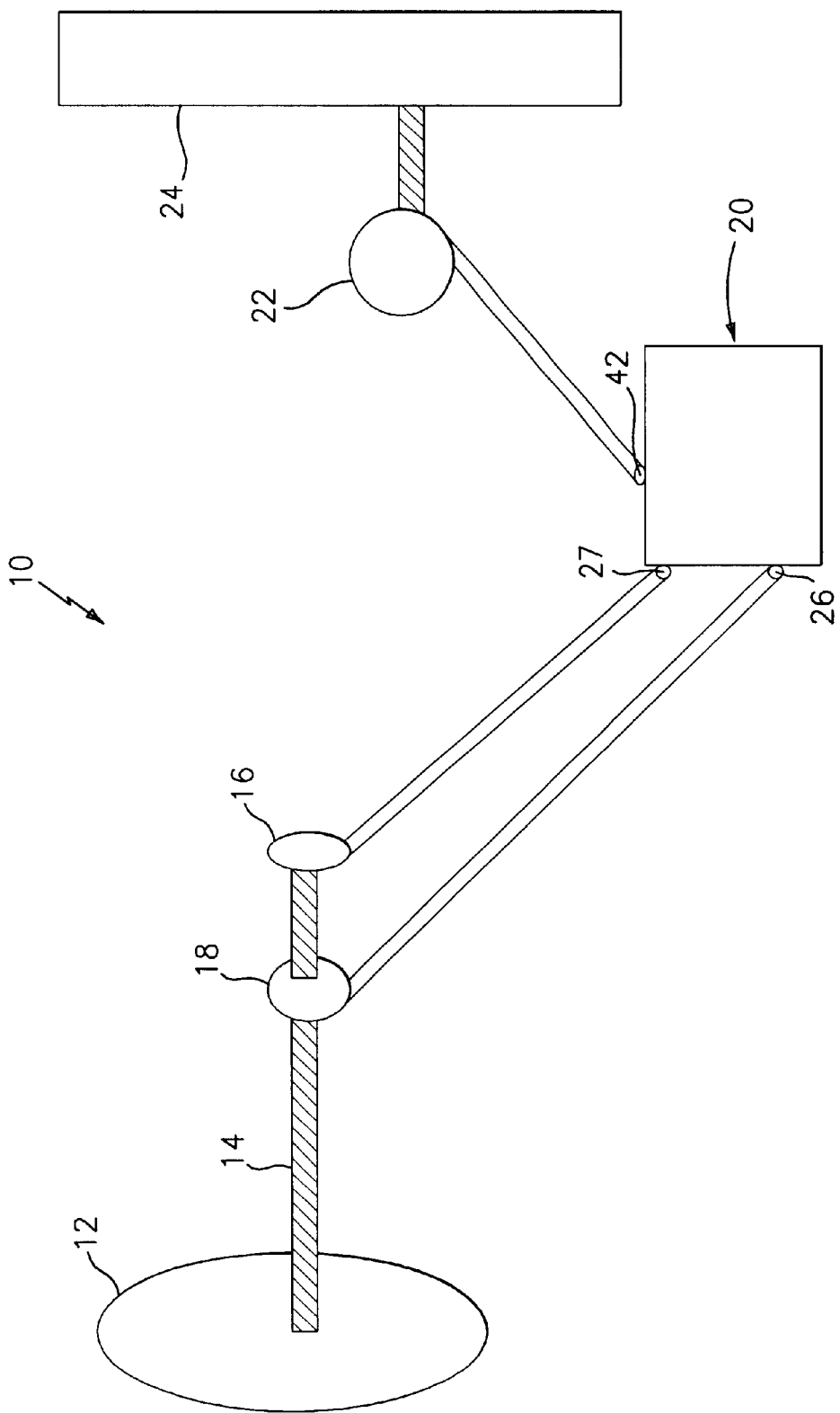
FIG. 1 is an elevational view of a vehicular steer-by-wire system.

As shown in FIG. 1, a vehicular steer-by-wire system is indicated generally by the reference numeral 10. The system 10 includes an input member or steering wheel 12, a coupling or steering shaft 14 connected to the steering wheel 12, a steering-angle sensor 16 connected to the shaft 14, a steering-torque sensor 18 connected to the shaft 14, an electronic controller 20 operably connected with the steering-angle sensor 16 and the steering-torque sensor 18, an output or road-wheel actuator 22 coupled in signal communication with the controller 20, and an output member or road-wheel 24 mechanically connected to the road-wheel actuator 22.

As may be recognized by those skilled in the pertinent art based on the teachings herein, various modifications may be made to this exemplary embodiment without departing from the scope or spirit of the present disclosure. For example, the steering wheel 12 may be replaced or supplemented with any of a number of input members for receiving the desired steering inputs of an operator, such as a control yoke or a joystick. In addition, although the exemplary steering-torque sensor 18 is mechanically coupled to the steering wheel 12 through the steering shaft 14, various other torque-sensing schemes may be apparent to those skilled in the pertinent art based on the teachings herein, such as, for example, integral piezo-electric sensors and non-contact electromagnetic sensors. The steering-angle sensor is typically embodied by an optical encoder, but may alternatively be embodied by, for example, a potentiometer or other device for sensing angular displacement.

The controller 20 is an electronic circuit comprising a digital micro-controller integrated circuit ("IC") such as, for example, an HC68000 series micro-controller IC manufactured by Motorola Corporation. The controller 20 receives as input the electronic signal 27 produced by the steering-angle sensor 16 and the electronic signal 26 produced by the steering-torque sensor 18, and produces as output a control signal 42 for the road-wheel actuator 22. The control signal 42 has a power level that is capable of powering an actuator, and is input to the road-wheel actuator 22 that mechanically actuates the road wheel 24 according to the control signal 42.

Figure 2:
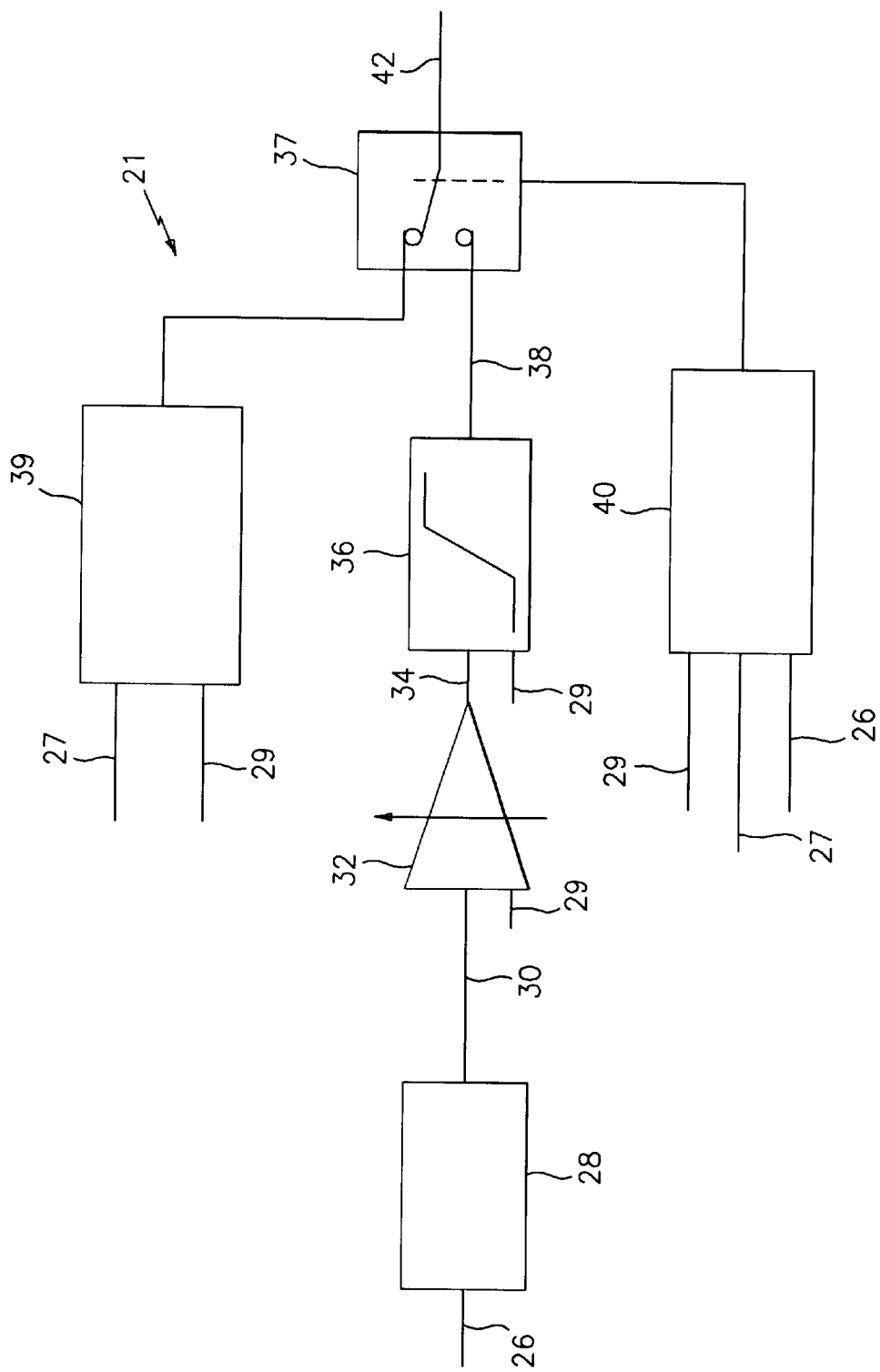
FIG. 2 is schematic circuit diagram of a control circuit.

As shown in FIG. 2, the controller 20 of FIG. 1 implements a control function indicated generally by the reference numeral 21. The control function 21 receives as inputs a differential torque signal 26 from the steering-torque sensor 18, a steering-angle signal 27 from the steering-angle sensor 16, and a vehicle speed signal 29 indicative of the relative velocity of the vehicle (not shown) with respect to the travel medium (e.g., road or land surface, also not shown). A position ratio unit 39 corresponding to a desired steering-ratio function that varies according to the current value of the steering-angle signal 27 and the speed signal 29, processes the steering-angle signal 27.

Under normal operation, the steering-angle sensor 16 detects the position and movement of the steering wheel 12 and sends a steering-angle signal 27 to the controller 20. The controller 20 combines the steering-angle signal 27 with the vehicle speed signal 29 to produce the road wheel control signal 42 that is sent to the road-wheel actuator 22 for controlling the steering angle of the road wheel 24. Thus, under normal operation, the output signal 26 produced by the torque sensor 18 is not required for determination of the command signal 42. It shall be understood that the road wheel command signal 42 may also correspond to additional sensor signals and functions, as may be desirable for alternate applications.

The control function 21 is used in the calculation of the road-wheel control signal 42. The position ratio unit 39 receives the steering-angle signal 27. The position ratio unit 39 also receives the vehicle speed signal 29. The steering-angle signal 27 and the vehicle speed signal 29 are used as inputs to unit 39, which comprises a multiplier, to generate a variable steering ratio signal at unit 39. The resulting variable steering ratio signal is passed to a road wheel command switch 37. It will be recognized that although the exemplary position ratio unit 39 comprises a multiplier, other means for serving the function of the multiplier may be substituted therefor, such as, for example, a non-linear algorithm or a three-dimensional look-up table.

The integration sub-function 28 has an anti-windup feature and integrates the differential torque signal 26 over time to produce a signal 30 indicative of the torque applied to the steering wheel 12. The system 10 can have the integration sub-function 28 in or out. When the integration sub-function 28 is out, a change in direction in the torque sensor 18 causes the corresponding control signal 42 to the road wheels 24 to be immediate. With the integration sub-function 28 in, the system 10 changes direction at a slower rate than the torque input signal 26, as it unwinds the integration sub-function 28 before a direction change occurs. A variable gain function 32 scales the gain applied to the signal 30 based on the speed signal 29 to produce a speed-weighted steering-correction signal 34. The speed-weighted signal 34 is then limited according to limiting function 36 in order to create a speed-limited steering correction signal 38, and thus to avoid an excessive change in steering angle at higher vehicle speeds.

The controller 20 generally receives signals from the sensors 16 and 18, and determines whether each received signal is valid or erroneous, as described below. The switch 37 is used to selectively pass either the output of block 36 in a fail-safe or backup mode, corresponding to the torque signal 26, or the output of unit 39 in a normal mode, corresponding to the position signal 27, to a road-wheel position command generator 40. In the backup mode where the controller 20 is receiving a valid signal 26 from the steering-torque sensor 18, but not receiving a valid signal 27 from the steering-angle sensor 16, the switch 37 determined by the road-wheel position command generator 40 to produce a signal 42 corresponding to the speed-limited signal 38 for controlling the road-wheel actuator 22 in accordance with the differential torque signal 26.

In the normal mode of operation, the controller 20 receives a valid signal from the steering-angle sensor 16 and the switch 37 determined by the road-wheel position command generator 40 to produce a signal 42 corresponding to the output of the steering-angle sensor 16 for controlling the road-wheel actuator 22. Thus, the output of unit 39 is selected as an input of block 37 and is passed through to signal 42. Block 40 controls the output selection of block 37 according to input signals 27, 29 and 26 that correspond respectively to hand wheel position, vehicle speed, and steering wheel torque. From these signals, block 40 determines how to route signal 38 and the signal from unit 39 through block 37. When a position fault is detected, block 37 determined by block 40 routes signal 38 as an output; when no position fault is detected, block 37 routes a signal from unit 39 as an output.

In an alternate embodiment, the torque sensor is used to steer the system in the primary normal mode, and the position sensor is used in the secondary backup mode. Accordingly, when the alternate embodiment controller receives a valid signal from the steering-angle sensor but no valid signal from the steering-torque sensor, the switch determined by the road-wheel position command generator to produce a signal corresponding to the output of the steering-angle sensor for controlling the road-wheel actuator.

Figure 3:
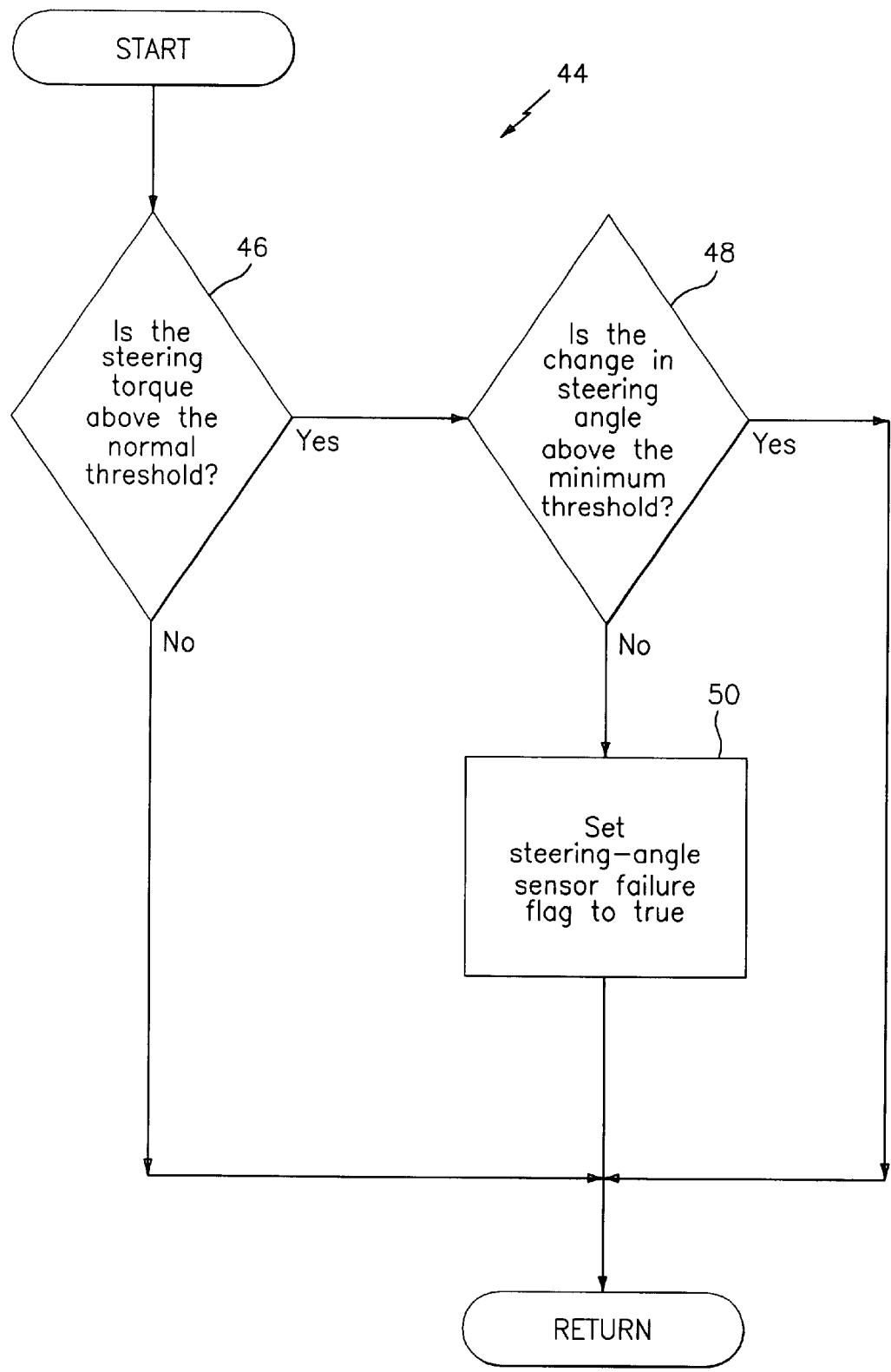
FIG. 3 is a flowchart for an error detection method of a vehicular steer-by-wire system.

Turning to FIG. 3, the switch 37 of FIG. 2 operates in correspondence with a control algorithm, which is indicated generally by the reference numeral 44. The control algorithm 44 embodies a method for determining whether the steering-angle sensor 16 may be providing an erroneous signal. Decision block 46 shows that a measured torque signal 26 received from the steering-torque sensor 18 that is in excess of a normal threshold value is considered to be potentially indicative of an erroneous signal from the steering-angle sensor 16. If the measured torque value is not greater than the threshold value, the decision block fails and the function returns without setting a steering-angle sensor failure flag, thus indicating a valid signal. However, if the decision block detects a steering input torque above a normal threshold, the steering-angle sensor signal itself is differentiated to determine its current time-rate of change. As shown in decision block 48, if the steering-angle rate of change is negligible, the steering-angle sensor failure flag is set to true as shown in function block 50, thus indicating an erroneous steering-angle signal.

As may be recognized by those of ordinary skill in the pertinent art, various other methods for determining the reliability of the respective signals from the steering-angle sensor 16 and the steering-torque sensor 18 may be employed without departing from the scope or spirit of the teachings herein. For example, even if the time-rate of change of the signal produced by the steering-angle sensor 16 is not negligible in the presence of an abnormally high steering-torque sensor signal 26, the steering-angle sensor signal 27 may still be flagged as invalid if the signal 27 received from the steering-angle sensor 16 is highly discontinuous as might be indicative of other failure modes wherein the signal produced by the steering-angle sensor 16 is not truly indicative of the road wheel angle desired by the vehicle operator. Likewise, the validity of the signal 26 received from the torque sensor 18 may be determined in accordance with the steering-angle signal 27 and the speed signal 29. For example, if the steering-angle signal 27 represents a large angular movement and the vehicle speed signal 29 indicates a slow vehicle speed, a very low torque signal 26 may be suspect depending on the level of power-assist and other possible input signals such as, for example, signals indicative of road surface conditions such as rain or ice.

Any signal determined to be suspect may be assigned a confidence index as well as a set failure flag. Thus, if both the steering-angle sensor and the steering-torque sensor are suspected of failure, the control circuit 20 may still produce a control signal that is most likely to permit the operator to maintain control of the vehicle.

Any suitable output actuator 22 may be substituted for the road-wheel actuator 22 for application to multiple vehicle types. For example, actuators suitable for marine use would be used to control one or more rudders on a boat, and actuators suitable for aviation use would be used to actuate one or more control surfaces on an aircraft.

The natural instinct of an operator using the input device in the presence of restricted motion or seizure of the input device would be to turn it in the desired direction of travel, producing an increased torque. A signal from the steering-torque sensor may therefore be used to sense a torque level in a particular direction, even in the absence of measurable movement from the input device. This facilitates a method of utilizing a signal from the steering-torque sensor to control the output device or road wheel angle until the input torque is reduced. An output or road-wheel actuator is provided that converts the control output, which corresponds to one or both of the steering-angle sensor and steering-torque sensor signals, into motion of the output device or steered road-wheel.

This disclosure contemplates the optional use of multiple torque sensors and multiple position sensors in order to provide additional hardware redundancy. One such embodiment comprises two torque sensors and two position sensors in place of the single torque sensor and single position sensor described in the primary exemplary embodiment.

It shall be recognized that although it is currently preferable to incorporate a vehicle speed signal such as signal 29 of the exemplary embodiment, such signal is not required. Accordingly, an alternate embodiment controller does not receive nor require any signal indicative of vehicle speed.

Vehicles incorporating the above described and like embodiments may be safely controlled in emergency situations such as those corresponding to partial failures of the steer-by-wire system. Steering control is also enhanced in non-failure modes of operation by using the signal representing the torque applied to the input device to enhance the rate of change of the output signals. Redundancy is enhanced while the number of additional components to implement this enhancement are minimized, thereby reducing the cost of providing the redundancy and reducing the packaging constraints within the vehicle.

While exemplary embodiments have been shown and described, various modifications and substitutions may be made thereto without departing from the scope and spirit of the present disclosure. Accordingly, it will be understood that the present disclosure has been made by way of illustration only, and that such illustrations and embodiments as have been disclosed herein are to be construed in an exemplary sense, and not as limiting to the claims.

What is claimed is:

1. A method of steering a vehicle comprising:
   measuring a force applied to a steering input device and generating a force signal indicative of said force;
   measuring a position of said steering input device and generating a position signal indicative of said position, said steering input device being operator-actuable;
   controlling a steering output member using a steering actuator, said steering output member being mechanically isolated from said steering input device such that there is no mechanical linkage between said steering input device and said steering output member; and
   in said method including a first mode of operatin and a second mode of operation, in said second mode of operation, determining from said force signal, a steering correction signal is generated controlling a steering actuator based on said steering correction signal.

2. The method of claim 1 wherein said steering correction signal does not depend on a steering input position sensor.

3. The method of claim 1 wherein said steering correction signal is a speed limited steering correction signal such that excessive changes of said steering correction signal is avoided at higher vehicle speeds.

4. The method of claim 1 wherein said steering input device is a steering wheel and said force signal is a signal representative of torque present in a steering shaft resulting from driver effort applied to said steering wheel which is fixed to said steering shaft.

5. The method of claim 1 wherein said force signal is output from an integration sub-function which relies on a differential force input.

6. The method of claim 5 wherein said force signal is passed through a variable gain function that scales a gain applied to the force signal based on a speed of said vehicle to produce a speed-weighted steering-correction signal.

7. The method of claim 1 wherein, in said first mode of operation controlling a steering actuator based on said position signal.

8. The method of claim 7 wherein said second mode is employed when a steering position measuring device used for said measuring said position of said steering input is judged to be faulty.

9. A steering system for a vehicle comprising:
   a steering input device;
   a force sensor measuring a force applied to said steering input device and generating a force signal indicative of said force;
   a position sensor measuring a position of said steering input device and generating a position signal indicative of said position, said steering input device being operator-actuable;
   a controller in electronic communication with a steering actuator for changing a position of a steering output member to affect a direction of said vehicle, said steering output member being mechanically isolated from said steering input device such that there is no mechanical linkage between said steering input device and said steering output member; and
   said controller having a mode of operation in which said steering actuator is controlled based on a steering correction signal which in turn is based on said force signal.

10. The steering system of claim 9 wherein said steering correction signal does not depend on a steering input position sensor.

11. The steering system of claim 9 wherein said steering correction signal is a speed limited steering correction signal such that excessive changes of said steering correction signal is avoided at higher vehicle speeds.

12. The steering system of claim 9 wherein said steering input device is a steering wheel and said force signal is a signal representative of torque present in a steering shaft resulting from driver effort applied to said steering wheel which is fixed to said steering shaft.

13. The steering system of claim 9 wherein said force signal is output from an integration sub-function which relies on a differential force input.

14. The steering system of claim 13 wherein said force signal is passed through a variable gain function that scales a gain applied to the force signal based on a speed of said vehicle to produce a speed-weighted steering-correction signal.

15. The steering system of claim 9 further comprising another mode including
   controlling a steering actuator based on said position signal and not on said force signal.

16. The steering system of claim 14 wherein said mode of operation in which said steering actuator is controlled based on a steering correction signal which in turn is based on said force signal is employed when said position sensor is judged to be faulty.

* * * * *